United States Patent
Oyama et al.

(10) Patent No.: US 10,693,138 B2
(45) Date of Patent: Jun. 23, 2020

(54) CATHODE MATERIAL FOR LITHIUM-ION SECONDARY BATTERY, CATHODE FOR LITHIUM-ION SECONDARY BATTERY, AND LITHIUM-ION SECONDARY BATTERY

(71) Applicant: SUMITOMO OSAKA CEMENT CO., LTD., Tokyo (JP)

(72) Inventors: Masataka Oyama, Tokyo (JP); Koji Oono, Tokyo (JP); Takao Kitagawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 156 days.

(21) Appl. No.: 15/936,005

(22) Filed: Mar. 26, 2018

(65) Prior Publication Data
US 2018/0309128 A1    Oct. 25, 2018

(30) Foreign Application Priority Data

Apr. 24, 2017  (JP) ................... 2017-085272

(51) Int. Cl.
| | |
|---|---|
| *H01M 4/58* | (2010.01) |
| *C01B 25/45* | (2006.01) |
| *H01M 10/0525* | (2010.01) |
| *H01M 4/36* | (2006.01) |
| *H01M 4/62* | (2006.01) |

(Continued)

(52) U.S. Cl.
CPC .......... *H01M 4/5825* (2013.01); *C01B 25/45* (2013.01); *H01M 4/136* (2013.01); *H01M 4/366* (2013.01); *H01M 4/625* (2013.01); *H01M 10/0525* (2013.01); *C01P 2004/50* (2013.01); *C01P 2004/53* (2013.01); *C01P 2004/61* (2013.01); *C01P 2004/62* (2013.01);

(Continued)

(58) Field of Classification Search
CPC .............. C01P 2004/53; C01P 2004/62; C01P 2004/61; H01M 4/5825; H01M 4/136
See application file for complete search history.

(56) References Cited

U.S. PATENT DOCUMENTS

2009/0117022 A1* 5/2009 Nuspl ................ C01B 25/37
423/306

FOREIGN PATENT DOCUMENTS

| JP | 2009-004371 A | 1/2009 |
|---|---|---|
| JP | 2011-049161 A | 3/2011 |

(Continued)

OTHER PUBLICATIONS

Office Action for Japanese Patent Application No. 2017-085272 (dated Jan. 16, 2018).

*Primary Examiner* — Ladan Mohaddes
(74) *Attorney, Agent, or Firm* — Merchant & Gould P.C.

(57) ABSTRACT

A cathode material is provided which comprises secondary particles of cathode active material particles including central particles of $Li_xFe_yM_zPO_4$ and a carbonaceous film which coats the central particles, wherein a particle size distribution thereof has maximum values of a relative particle amount on both fine and coarse particle sides. A particle diameter with the maximum relative particle amount on the fine particle side is in a range A of 0.70 μm to 2.00 μm, and a particle diameter with the maximum relative particle amount on the coarse particle side is in a range B of 7.00 μm to 15.00 μm. A difference between maximum values of a relative particle amount is 2.00% to 6.00%.

12 Claims, 1 Drawing Sheet

(51) Int. Cl.
*H01M 4/136* (2010.01)
*H01M 4/02* (2006.01)

(52) U.S. Cl.
CPC ... *C01P 2006/40* (2013.01); *H01M 2004/028* (2013.01); *H01M 2220/20* (2013.01)

(56) References Cited

FOREIGN PATENT DOCUMENTS

JP  2012-104290 A  5/2012
JP  2013-182689 A  9/2013

* cited by examiner

CATHODE MATERIAL FOR LITHIUM-ION SECONDARY BATTERY, CATHODE FOR LITHIUM-ION SECONDARY BATTERY, AND LITHIUM-ION SECONDARY BATTERY

CROSS-REFERENCE TO RELATED APPLICATIONS

This application claims the benefit of Japanese Patent Application No. 2017-085272 filed Apr. 24, 2017, the disclosure of which is herein incorporated by reference in its entirety.

BACKGROUND OF THE INVENTION

Field of the Invention

The present invention relates to a cathode material for a lithium-ion secondary battery, a cathode for a lithium-ion secondary battery, and a lithium-ion secondary battery.

Description of Related Art

In recent years, as batteries anticipated to have a small size and a high capacity and weigh less, non-aqueous electrolytic solution-based secondary batteries such as lithium-ion secondary batteries have been proposed and put into practical use. Lithium-ion secondary batteries are constituted of a cathode and an anode which have properties capable of reversibly intercalating and deintercalating lithium ions, and a non-aqueous electrolyte.

As anode active materials for anode materials of lithium-ion secondary batteries, generally, carbon-based materials or Li-containing metal oxides having properties capable of reversibly intercalating and deintercalating lithium ions are used. Examples of the Li-containing metal oxides include lithium titanate ($Li_4Ti_5O_{12}$).

Meanwhile, as cathodes of lithium-ion secondary batteries, cathode material mixtures including a cathode material, a binder, and the like are used. As a cathode active material, for example, Li-containing metal oxides having properties capable of reversibly intercalating and deintercalating lithium ions such as lithium iron phosphate ($LiFePO_4$) are used. In addition, cathodes of lithium-ion secondary batteries are formed by applying the cathode material mixture onto the surface of a metal foil that is called an electrode current collector.

As electrolytic solutions for lithium-ion secondary batteries, non-aqueous solvents are used. Non-aqueous solvents enable the application of cathode active materials that are oxidized and reduced at a high potential or anode active materials that are oxidized and reduced at a low potential. Therefore, lithium-ion secondary batteries having a higher voltage can be realized.

These lithium-ion secondary batteries have a small size and a higher energy and weigh less than secondary batteries in the related art such as lead batteries, nickel cadmium batteries, and nickel metal hydride batteries. Therefore, lithium-ion secondary batteries are used not only as small-sized power supplies used in portable electronic devices such as mobile phones and notebook personal computers but also as large-sized stationary emergency power supplies.

In recent years, there has been a demand for the performance improvement of lithium-ion secondary batteries, and a variety of studies have been carried out. For example, in a case in which a lithium-ion secondary battery is used in a high-current density region, there is a demand for additional improvement in electron conductivity in order to improve the performance. Regarding the above-described property demands, techniques for coating the surfaces of cathode active materials with a carbonaceous material (hereinafter, in some cases, referred to as "carbonaceous film") are known (for example, refer to Japanese Laid-open Patent Publication No. 2009-004371, Japanese Laid-open Patent Publication No. 2011-049161, and Japanese Laid-open Patent Publication No. 2012-104290). As a method for coating the surface of a cathode active material with a carbonaceous film, methods in which a cathode active material and a carbon source are mixed together and this mixture is calcinated in an inert atmosphere or a reducing atmosphere are known.

SUMMARY OF THE INVENTION

In a case in which a cathode active material having a poor electron conductivity such as lithium iron phosphate is used, the contact resistance between the cathode active material and an electrode current collector is likely to increase compared with the electron migration resistance in a cathode material mixture. When the surface of the cathode active material is coated with a carbonaceous film as described in Japanese Laid-open Patent Publication No. 2009-004371, Japanese Laid-open Patent Publication No. 2011-049161, and Japanese Laid-open Patent Publication No. 2012-104290, it is possible to decrease the contact resistance between the cathode active material and the electrode current collector. However, compared with the electron migration resistance in the cathode material mixture, the contact resistance between the cathode active material and the electrode current collector is still likely to increase.

In an ordinary method for manufacturing a cathode for a lithium-ion secondary battery, when the cathode mixture layer formed on the electrode current collector is pressurized, the number of the contact points between the cathode active material and the electrode current collector increases, and the contact resistance between the cathode active material and the electrode current collector decreases. In a case in which a cathode active material which is likely to increase the contact resistance between the cathode active material and the electrode current collector such as lithium iron phosphate is used, the cathode mixture layer is pressurized as described below. When the pressure during the pressurization of the cathode mixture layer is adjusted to be strong, the number of the contact points between the cathode active material and the electrode current collector increases, and the contact resistance between the cathode active material and the electrode current collector decreases.

However, when the pressure during the pressurization of the cathode mixture layer is set to be strong, the density of the cathode mixture layer increases, and thus the porosity of an electrode decreases. When the porosity of an electrode excessively decreases, the electrode structure is likely to change due to the expansion and shrinkage of the cathode active material during a charge and discharge cycle. In addition, the number of lithium ion conduction paths in the electrode is likely to decrease or the conduction paths in the electrode are likely to rupture, and there is a problem in that the durability deteriorates.

The above-described deterioration phenomenon has a small influence in the case of lithium-ion secondary batteries having an electrode with a small thickness, but has a large influence in the case of lithium-ion secondary batteries having an electrode with a large thickness. In lithium-ion secondary batteries, the priorities in characteristics vary depending on uses, and thus the structures also vary. For example, in the case of a stationary storage battery for which a high energy density and favorable durability are required, a design for improving the energy density by increasing the thickness of the electrode is considered. However, in a case in which a cathode active material having a poor electron conductivity such as lithium iron phosphate is used, it is necessary to increase the pressure for pressurizing the cathode mixture layer as described above. Therefore, the porosity of the electrode excessively decreases, and there are cases in which the electrode structure changes due to the expansion and shrinkage of the cathode active material during a charge and discharge cycle, and the durability deteriorates.

As described above, in order to sufficiently decrease the contact resistance between the cathode active material and the electrode current collector, it is necessary to strongly pressurize the cathode mixture layer. However, in a case in which the porosity of the electrode is increased in order to suppress the deterioration of the durability caused by a change in the electrode structure arising from the expansion and shrinkage of the cathode active material during a charge and discharge cycle as much as possible, in cathode active materials of the related art, the contact resistance between the cathode active material and the electrode current collector decreases, and it is difficult to decrease the density of the cathode mixture layer.

The present invention has been made in consideration of the above-described circumstances, and an object of the present invention is to provide a cathode material for a lithium-ion secondary battery which is capable of sufficiently decreasing the contact resistance between a cathode active material and an electrode current collector, capable of increasing the porosity of an electrode by decreasing the density of a cathode mixture layer even in the case of strongly pressurizing the cathode mixture layer, and capable of suppressing the deterioration of the durability of an electrode caused by a change in the electrode structure arising from the expansion and shrinkage of the cathode active material during a charge and discharge cycle, a cathode for a lithium-ion secondary battery including the cathode material for a lithium-ion secondary battery, and a lithium-ion secondary battery including the cathode for a lithium-ion secondary battery.

The present inventors and the like carried out intensive studies in order to achieve the above-described object, consequently found that, when a cathode material for a lithium-ion secondary battery is made of granular secondary particles obtained by granulating cathode active material particles including central particles represented by General Formula $Li_xFe_yM_zPO_4$ (here, M represents at least one element selected from the group consisting of Mg, Ca, Co, Sr, Ba, Ti, Zn, B, Al, Ga, In, Si, Ge, and rare earth elements, $0.95 \le x \le 1.10$, $0.80 \le y \le 1.10$, and $0.00 \le z \le 0.20$) and a carbonaceous film that coats the surfaces of the central particles, a particle size distribution of the secondary particles has a maximum value of a relative particle amount on a fine particle side and a maximum value of a relative particle amount on a coarse particle side, a particle diameter at which the relative particle amount (%) on the fine particle side in the particle size distribution is maximized is in a range A of 0.70 μm or more and 2.00 μm or less, a particle diameter at which the relative particle amount (%) on the coarse particle side in the particle size distribution is maximized is in a range B of 7.00 μm or more and 15.00 μm or less, and a difference between a relative particle amount (%) at a particle diameter at which the relative particle amount of the secondary particles having a particle diameter in the range A is maximized and a relative particle amount (%) at a particle diameter at which the relative particle amount of the secondary particles having a particle diameter in the range B is maximized is set to 2.00% or more and 6.00% or less, it is possible to sufficiently decrease the contact resistance between a cathode active material and an electrode current collector, the porosity of an electrode does not excessively decreases even when the cathode mixture layer is strongly pressurized, and it is possible to suppress the change in the electrode structure due to the expansion and shrinkage of lithium iron phosphate during a charge and discharge cycle, and completed the present invention. Therefore, it is possible to provide a cathode material for a lithium-ion secondary battery in which the number of lithium ion conduction paths in the electrode does not easily decrease or the conduction paths in the electrode do not easily rupture, and the deterioration of the durability can be prevented.

A cathode material for a lithium-ion secondary battery of the first aspect of the present invention is made of granular secondary particles obtained by granulating cathode active material particles including central particles represented by General Formula $Li_xFe_yM_zPO_4$ (here, M represents at least one element selected from the group consisting of Mg, Ca, Co, Sr, Ba, Ti, Zn, B, Al, Ga, In, Si, Ge, and rare earth elements, $0.95 \le x \le 1.10$, $0.80 \le y \le 1.10$, and $0.00 \le z \le 0.20$) and a carbonaceous film that coats surfaces of the central particles, a particle size distribution of the secondary particles has a maximum value of a relative particle amount on a fine particle side and a maximum value of a relative particle amount on a coarse particle side, a particle diameter at which the relative particle amount (%) on the fine particle side in the particle size distribution is maximized is in a range A of 0.70 μm or more and 2.00 μm or less, a particle diameter at which the relative particle amount (%) on the coarse particle side in the particle size distribution is maximized is in a range B of 7.00 μm or more and 15.00 μm or less, and a difference between a relative particle amount (%) at a particle diameter at which the relative particle amount of the secondary particles having a particle diameter in the range A is maximized and a relative particle amount (%) at a particle diameter at which the relative particle amount of the secondary particles having a particle diameter in the range B is maximized is 2.00% or more and 6.00% or less.

In other words, the present invention provides a cathode material for a lithium-ion secondary battery, the cathode material comprising:

granular secondary particles which are granulated cathode active material particles, wherein the cathode active material particles include central particles represented by general formula $Li_xFe_yM_zPO_4$ (here, M represents at least one element selected from the group consisting of Mg, Ca, Co, Sr, Ba, Ti, Zn, B, Al, Ga, In, Si, Ge, and rare earth elements, $0.95 \le x \le 1.10$, $0.80 \le y \le 1.10$, and $0.00 \le z \le 0.20$) and a carbonaceous film that coats surfaces of the central particles, a particle size distribution of the secondary particles has at least two peaks, wherein the particle size distribution has a maximum value of a relative particle amount (%) on a fine particle side and a maximum value of a relative particle amount (%) on a coarse particle side, a particle diameter at which the relative particle amount (%) is maximized on the fine particle side in the particle size distribution is included in a range A which is 0.70 μm or more and 2.00 μm or less, a particle diameter at which the relative particle amount (%) is maximized on the coarse particle side in the particle size distribution is included in a range B which is 7.00 μm or more and 15.00 μm or less, and a difference between the maximum values of the relative particle amount (%) is 2.00% or more and 6.00% or less, wherein the former maximum value corresponds to a particle diameter of the secondary particles at which the relative particle amount is maximized while the particle diameter is in the range A, and the later maximum value corresponds to a particle diameter of the secondary particles at which the relative particle amount of the secondary particles is maximized while the particle diameter is in the range B. It is preferable that the cathode material described above preferably has the following characteristics.

The cathode material may consist of the granular secondary particles.

The secondary particles may consist of the granulated cathode active material particles.

The cathode active material particles may consist of the central particles and the carbonaceous film.

The particle size distribution of the secondary particles may only have two peaks.

The central particles may consist essentially of $LiFePO_4$.

A cathode for a lithium-ion secondary battery of the second aspect of the present invention is a cathode for a lithium-ion secondary battery including an electrode current collector and a cathode mixture layer formed on the electrode current collector, in which the cathode mixture layer includes the cathode material for a lithium-ion secondary battery of the present invention.

A lithium-ion secondary battery of the third aspect of the present invention includes the cathode for a lithium-ion secondary battery of the present invention.

Effects of the Invention

According to the cathode material for a lithium-ion secondary battery of the present invention, since the particle size distribution of the secondary particles has the maximum value of the relative particle amount on the fine particle side and the maximum value of the relative particle amount on the coarse particle side, the particle diameter at which the relative particle amount (%) on the fine particle side in the particle size distribution is maximized is in a range A of 0.70 μm or more and 2.00 μm or less, the particle diameter at which the relative particle amount (%) on the coarse particle side in the particle size distribution is maximized is in a range B of 7.00 μm or more and 15.00 μm or less, and the difference between the relative particle amount (%) at the particle diameter at which the relative particle amount of the secondary particles having a particle diameter in the range A is maximized and the relative particle amount (%) at a particle diameter at which the relative particle amount of the secondary particles having a particle diameter in the range B is maximized is 2.00% or more and 6.00% or less, it is possible to provide a cathode material for a lithium-ion secondary battery which is capable of sufficiently decreasing the contact resistance between a cathode active material and an electrode current collector, capable of increasing the porosity of an electrode by decreasing the density of a cathode mixture layer even in the case of strongly pressurizing the cathode mixture layer, and capable of suppressing the deterioration of the durability of the electrode caused by a change in the electrode structure arising from the expansion and shrinkage of the cathode active material during a charge and discharge cycle.

According to the cathode for a lithium-ion secondary battery of the present invention, since the cathode material for a lithium-ion secondary battery of the present invention is included, lithium-ion secondary batteries having a high energy density and excellent durability can be obtained.

According to the lithium-ion secondary battery of the present invention, since the cathode for a lithium-ion secondary battery of the present invention is included, lithium-ion secondary batteries having a high energy density and excellent durability can be obtained.

DETAILED DESCRIPTION OF THE INVENTION

Figure 1:
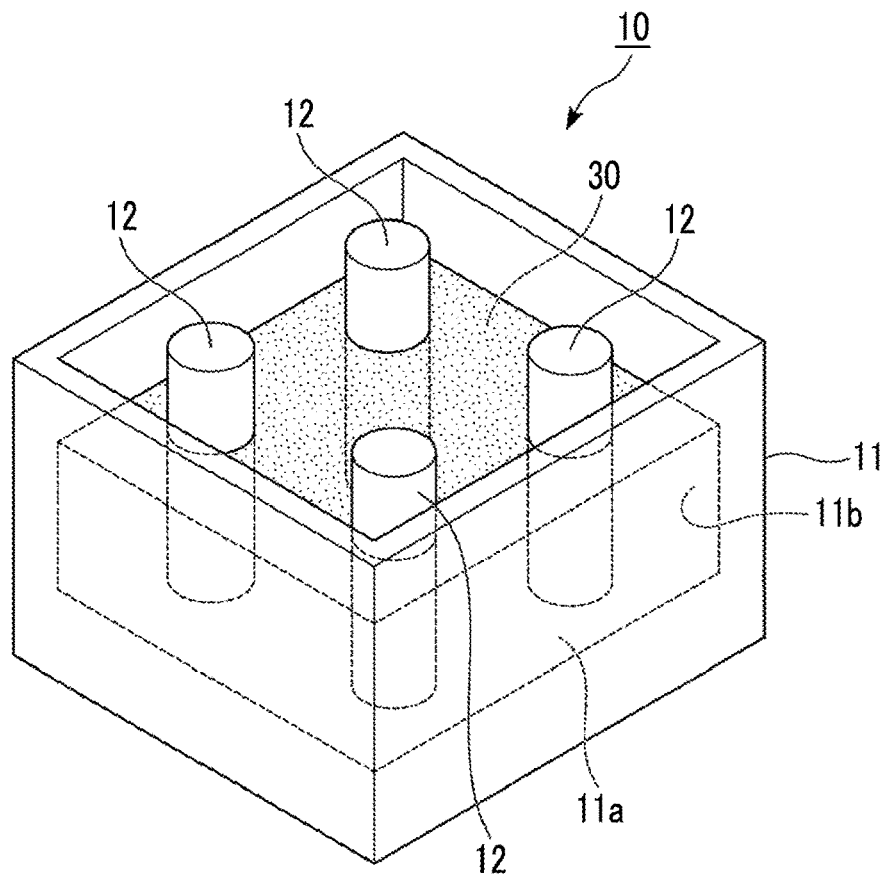
FIG. 1 is a perspective view illustrating a container for a thermal treatment which is used in a method for manufacturing a cathode material for a lithium-ion secondary battery of the present invention.

Preferable embodiments and examples of a cathode material for a lithium-ion secondary battery, a cathode for a lithium-ion secondary battery, and a lithium-ion secondary battery of the present invention will be described below.

Meanwhile, the present embodiment is specific description for better understanding of the gist of the present invention and does not limit the present invention unless particularly otherwise described. Addition, omission, substitution, and other modification of the constitution are allowed within the scope of the present invention.

Cathode Material for Lithium-Ion Secondary Battery

A cathode material for a lithium-ion secondary battery of the present embodiment comprises, preferably is made of, granular secondary particles obtained by granulating cathode active material particles. The secondary particles included central particles represented by General Formula $Li_xFe_yM_zPO_4$ (here, M represents at least one element selected from the group consisting of Mg, Ca, Co, Sr, Ba, Ti, Zn, B, Al, Ga, In, Si, Ge, and rare earth elements, $0.95 \leq x \leq 1.10$, $0.80 \leq y \leq 1.10$, and $0.00 \leq z \leq 0.20$) and a carbonaceous film that coats surfaces of the central particles. A particle size distribution of the secondary particles has a maximum value of a relative particle amount on a fine particle side and a maximum value of a relative particle amount on a coarse particle side, wherein a particle diameter at which the relative particle amount (%) on the fine particle side in the particle size distribution is maximized is in a range A of 0.70 μm or more and 2.00 μm or less, a particle diameter at which the relative particle amount (%) on the coarse particle side in the particle size distribution is maximized is in a range B of 7.00 μm or more and 15.00 μm or less. A difference between a relative particle amount (%) at a particle diameter at which the relative particle amount of the secondary particles having a particle diameter in the range A is maximized and a relative particle amount (%) at a particle diameter at which the relative particle amount of the secondary particles having a particle diameter in the range B is maximized is 2.00% or more and 6.00% or less.

The cathode material for a lithium-ion secondary battery of the present embodiment is made of granular secondary particles obtained by granulating cathode active material particles (primary particles) including central particles represented by General Formula $Li_xFe_yM_zPO_4$ and a carbonaceous film that coats the surfaces of the central particles.

The micropore diameter of the secondary particle forming the cathode material for a lithium-ion secondary battery of the present embodiment is preferably 80 nm or more and 1,000 nm or less and more preferably 100 nm or more and 500 nm or less.

When the micropore diameter of the secondary particle is 80 nm or more, it becomes easy for electrolytic solutions to penetrate into the inside of the secondary particle, and the migration of lithium ions becomes easy, which is preferable. Meanwhile, when the micropore diameter of the secondary particle is 1,000 nm or less, the contact frequency between the primary particles is high, and the strength of the secondary particles increases, and thus the secondary particles do not easily break during the kneading of electrode paste or the pressurization of an electrode (cathode mixture layer), and the electrode density does not easily increase more than necessary, which is preferable.

The micropore diameter of the secondary particle can be measured using a mercury porosimeter (a mercury intrusion method, apparatus name: POREMASTER, manufactured by Quantachrome Instruments Japan G.K.).

The particle size distribution of the cathode material for a lithium-ion secondary battery of the present invention may have two or more peaks, and preferably have two peaks. For example, when the particle size distribution has two peaks wherein one peak is included in a coarse particle side and one peak is included in a fine particle side, the particle size distribution may be divided by a valley position between two peaks into two parts, that is, said coarse particle side and fine particle side.

In the cathode material for a lithium-ion secondary battery of the present embodiment, the particle size distribution of the secondary particles has a maximum value of the relative particle amount on a fine particle side and a maximum value of the relative particle amount on a coarse particle side, that is, the particle size distribution is bimodal.

The particle diameter at which the relative particle amount (%) on the fine particle side in the particle size distribution of the secondary particles is maximized is 0.70 μm or more and 2.00 μm or less (range A) and preferably 0.80 μm or more and 1.60 μm or less.

Since the particle diameter at which the relative particle amount (%) on the fine particle side in the particle size distribution of the secondary particles is maximized is 0.70 μm or more, during the strong pressurization of a cathode mixture layer including the cathode material for a lithium-ion secondary battery, fine particles are not easily stuck in voids among coarse particles in the cathode mixture layer, and the porosity of the electrode (cathode mixture layer) increases. As a result, it is possible to suppress the deterioration of the durability of the electrode caused by the change in the electrode structure arising from the expansion and shrinkage of a cathode active material during a charge and discharge cycle. Meanwhile, since the particle diameter at which the relative particle amount (%) on the fine particle side in the particle size distribution of the secondary particles is maximized is 2.00 μm or less, it is possible to enhance the dispersibility and uniformity of a conductive auxiliary agent or a binder in the cathode mixture layer. As a result, in lithium-ion secondary batteries for which the cathode material for a lithium-ion secondary battery of the present embodiment is used, it is possible to increase the discharge capacity in high-speed charge and discharge.

The particle diameter at which the relative particle amount (%) on the coarse particle side in the particle size distribution of the secondary particles is maximized is 7.00 μm or more and 15.00 μm or less (range B) and preferably 8.00 μm or more and 12.00 μm or less.

Since the particle diameter at which the relative particle amount (%) on the coarse particle side in the particle size distribution of the secondary particles is maximized is 7.00 μm or more, during the preparation of cathode material paste for a lithium-ion secondary battery by mixing the cathode material for a lithium-ion secondary battery, the conductive auxiliary agent, the binder resin (binder), and a solvent, it is possible to suppress the amount of the conductive auxiliary agent and the binder resin blended. As a result, it is possible to increase the battery capacity of lithium-ion secondary batteries per unit mass of the cathode mixture layer. Meanwhile, since the particle diameter at which the relative particle amount (%) on the coarse particle side in the particle size distribution of the secondary particles is maximized is 15.00 μm or less, it is possible to suppress the unevenness of the electrode surface at a low level, and it is possible to prevent the bias of the current distribution in an electrode in-plane direction. As a result, in lithium-ion secondary batteries for which the cathode material for a lithium-ion secondary battery of the present embodiment is used, it is possible to increase the discharge capacity in high-speed charge and discharge.

In the cathode material for a lithium-ion secondary battery of the present embodiment, the difference between the relative particle amount (%) at a particle diameter at which the relative particle amount of the secondary particles having a particle diameter in the range A is maximized and the relative particle amount (%) at a particle diameter at which the relative particle amount of the secondary particles having a particle diameter in the range B is maximized is 2.00% or more and 6.00% or less and preferably 3.50% or more and 5.50% or less.

Since the difference between the relative particle amount (%) at a particle diameter at which the relative particle amount of the secondary particles having a particle diameter in the range A is maximized and the relative particle amount (%) at a particle diameter at which the relative particle amount of the secondary particles having a particle diameter in the range B is maximized is 2.00% or more, the porosity of the electrode does not easily decrease even when the cathode mixture layer including the cathode material for a lithium-ion secondary battery is strongly pressurized. As a result, it is possible to suppress the deterioration of the durability of the electrode caused by the change in the electrode structure arising from the expansion and shrinkage of the cathode active material during a charge and discharge cycle. Meanwhile, since the difference between the relative particle amount (%) at a particle diameter at which the relative particle amount of the secondary particles having a particle diameter in the range A is maximized and the relative particle amount (%) at a particle diameter at which the relative particle amount of the secondary particles having a particle diameter in the range B is maximized is 6.00% or less, when the cathode mixture layer including the cathode material for a lithium-ion secondary battery is strongly pressurized, the number of the contact points between cathode active material particles in the cathode mixture layer or between the cathode active material particles and the conductive auxiliary agent does not excessively decrease, and thus it is possible to suppress the deterioration of the durability of the electrode.

The average primary particle diameter of the cathode active material particles in the cathode material for a lithium-ion secondary battery of the present embodiment is preferably 10 nm or more and 700 nm or less and more preferably 20 nm or more and 500 nm or less.

When the average primary particle diameter of the cathode active material particles is 10 nm or more, the specific surface area of the cathode material for a lithium-ion secondary battery increases, and thus an increase in the mass of necessary carbon is suppressed, and it is possible to suppress a decrease in the charge and discharge capacity of lithium-ion secondary batteries. Meanwhile, when the average primary particle diameter of the cathode active material particles is 700 nm or less, it is possible to suppress the extension of time for lithium ions or electrons to migrate in the cathode material for a lithium-ion secondary battery. Therefore, it is possible to suppress an increase in the internal resistance of lithium-ion secondary batteries and the consequent deterioration of the output characteristics.

The amount of carbon included in the cathode material for a lithium-ion secondary battery of the present embodiment, that is, the amount of carbon forming the carbonaceous film is preferably 0.1 parts by mass or more and 10 parts by mass or less and more preferably 0.6 parts by mass or more and 3 parts by mass or less with respect to 100 parts by mass of the central particles.

When the amount of carbon is 0.1 parts by mass or more, the discharge capacity at a high charge-discharge rate of lithium-ion secondary batteries increases, and it is possible to realize sufficient charge and discharge rate performance. Meanwhile, when the amount of carbon is 10 parts by mass or less, it is possible to suppress the battery capacity of lithium-ion secondary batteries per unit mass of the cathode material for a lithium-ion secondary battery being decreased more than necessary.

The proportion of the carbon supporting amount in the specific surface area of the primary particles of the central particles constituting the cathode material for a lithium-ion secondary battery ("[the carbon supporting amount]/[the specific surface area of the primary particles of the central particles]"; hereinafter, referred to as "carbon supporting amount ratio") is preferably 0.01 $g/m^2$ or more and 0.5 $g/m^2$ or less and more preferably 0.03 $g/m^2$ or more and 0.3 $g/m^2$ or less.

When the carbon supporting amount ratio is 0.01 $g/m^2$ or more, the discharge capacity at a high charge-discharge rate of the lithium-ion secondary battery increases, and it is possible to realize sufficient charge and discharge rate performance. Meanwhile, when the carbon supporting amount ratio is 0.5 $g/m^2$ or less, it is possible to suppress the battery capacity of lithium-ion secondary batteries per unit mass of the cathode material for a lithium-ion secondary battery being decreased more than necessary.

The BET specific surface area of the cathode material for a lithium-ion secondary battery is preferably 5 $m^2/g$ or more and 20 $m^2/g$ or less.

When the BET specific surface area is 5 $m^2/g$ or more, the coarsening of the cathode material for a lithium-ion secondary battery is suppressed, and it is possible to increase the diffusion rate of lithium ions in the particles. Therefore, it is possible to improve the battery characteristics of lithium-ion secondary batteries. Meanwhile, when the BET specific surface area is 20 $m^2/g$ or less, it is possible to prevent an excessive increase in the porosity of the electrode in cathodes including the cathode material for a lithium-ion secondary battery of the present embodiment, and thus it is possible to provide lithium-ion secondary batteries having a high energy density.

The average secondary particle diameter of the cathode material for a lithium-ion secondary battery is preferably 3.00 μm or more and 16.00 μm or less and more preferably 5.00 μm or more and 14.00 μm or less.

When the average secondary particle diameter is 3.00 μm or more, during the preparation of cathode material paste for a lithium-ion secondary battery by mixing the cathode material for a lithium-ion secondary battery, the conductive auxiliary agent, the binder resin (binder), and the solvent, it is possible to suppress the amount of the conductive auxiliary agent and the binder resin blended. As a result, it is possible to increase the battery capacity of lithium-ion secondary batteries per unit mass of the cathode mixture layer. Meanwhile, when the average secondary particle diameter is 16.00 μm or less, it is possible to enhance the dispersibility and uniformity of the conductive auxiliary agent or the binder in the cathode mixture layer. As a result, in lithium-ion secondary batteries for which the cathode material for a lithium-ion secondary battery of the present embodiment is used, it is possible to increase the discharge capacity in high-speed charge and discharge.

Here, the average secondary particle diameter refers to the volume-average particle diameter. The average secondary particle diameter of the secondary particles of the cathode material for a lithium-ion secondary battery can be measured using a laser diffraction and scattering particle size distribution measurement instrument or the like. In addition, it is also possible to arbitrarily select a plurality of secondary particles observed using a scanning electron microscope (SEM) and calculate the average particle diameter of the secondary particles.

Central Particles

The central particles constituting the cathode material for a lithium-ion secondary battery of the present embodiment are made of a cathode active material represented by General Formula $Li_xFe_yM_zPO_4$ (here, M represents at least one element selected from the group consisting of Mg, Ca, Co, Sr, Ba, Ti, Zn, B, Al, Ga, In, Si, Ge, and rare earth elements, 0.95≤x≤1.10, 0.80≤y≤1.10, and 0.00≤z≤0.20).

Meanwhile, the rare earth elements refer to 15 elements of La, Ce, Pr, Nd, Pm, Sm, Eu, Gd, Tb, Dy, Ho, Er, Tm, Yb, and Lu which are in the lanthanum series.

Examples of the compound represented by General Formula $Li_xFe_yM_zPO_4$ include $LiFePO_4$, $LiFe_{0.95}Mg_{0.05}PO_4$, $Li_{0.95}Fe_{0.95}Al_{0.05}$, and the like. Among these, $LiFePO_4$ is preferred since metals not exhibiting the electrochemical activity are not included, and the theoretical energy density increases most.

The shape of the primary particle of the central particle constituting the cathode material for a lithium-ion secondary battery of the present embodiment is not particularly limited, but the shape of the primary particle of the central particle is preferably a spherical shape since a cathode active material made of spherical, particularly, truly spherical agglomerates is easily generated.

When the shape of the primary particle of the central particle is a spherical shape, it is possible to decrease the amount of a solvent when cathode material paste is prepared by mixing the cathode material for a lithium-ion secondary battery, a binder resin (binder), and the solvent. In addition, when the shape of the primary particle of the central particle is a spherical shape, the application of the cathode material paste to the electrode current collector becomes easy. Furthermore, when the shape of the primary particle of the central particle is a spherical shape, the surface area of the primary particle of the central particle is minimized, and it is possible to minimize the amount of the binder resin (binder) blended into the cathode material paste. As a result, it is possible to decrease the internal resistance of cathodes for which the cathode material for a lithium-ion secondary battery of the present embodiment is used. In addition, when the shape of the primary particle of the central particle is a spherical shape, it becomes easy to closely pack the cathode material, and thus the amount of the cathode material for a lithium-ion secondary battery packed per unit volume of the cathode increases. As a result, it is possible to increase the cathode density, and high-capacity lithium-ion secondary batteries can be obtained.

Carbonaceous Film

The carbonaceous film coats the surfaces of the central particles.

When the surfaces of the central particles are coated with the carbonaceous film, it is possible to improve the electron conductivity of the cathode material for a lithium-ion secondary battery.

The thickness of the carbonaceous film is preferably 0.2 nm or more and 10 nm or less and more preferably 0.5 nm or more and 4 nm or less.

When the thickness of the carbonaceous film is 0.2 nm or more, it is possible to prevent the excessively thin thickness of the carbonaceous film from disabling the formation of films having a desired resistance value. In addition, it is possible to ensure a conduction property suitable for the cathode material for a lithium-ion secondary battery. Meanwhile, when the thickness of the carbonaceous film is 10 nm or less, it is possible to suppress a decrease in the battery capacity per unit mass of the cathode material for a lithium-ion secondary battery.

In addition, when the thickness of the carbonaceous film is 0.2 nm or more and 10 nm or less, it becomes easy to closely pack the cathode material for a lithium-ion secondary battery, and thus the amount of the cathode material for a lithium-ion secondary battery packed per unit volume of the cathode increases. As a result, it is possible to increase the cathode density, and high-capacity lithium-ion secondary batteries can be obtained.

The coating ratio of the carbonaceous film to the central particles is preferably 60% or more and 95% or less and more preferably 80% or more and 95% or less. When the coating ratio of the carbonaceous film is 60% or more, the coating effect of the carbonaceous film can be sufficiently obtained.

Density of Carbonaceous Film

The density of the carbonaceous film, which is calculated using the carbon amount in the carbonaceous film, is preferably 0.3 g/cm$^3$ or more and 1.5 g/cm$^3$ or less and more preferably 0.4 g/cm$^3$ or more and 1.0 g/cm$^3$ or less.

Here, the reasons for limiting the density of the carbonaceous film, which is calculated using the carbon amount in the carbonaceous film, to the above-described range are as described below. When the density of the carbonaceous film, which is calculated using the carbon amount in the carbonaceous film, is 0.3 g/cm$^3$ or more, the carbonaceous film exhibits sufficient electron conductivity. Meanwhile, when the density of the carbonaceous film is 1.5 g/cm$^3$ or less, the amount of the fine crystals of graphite made of a lamellar structure included in the carbonaceous film is small, and thus no steric hindrance is generated by the fine crystals of the graphite during the diffusion of lithium ions in the carbonaceous film. Therefore, there are no cases in which the lithium ion migration resistance increases. As a result, there are no cases in which the internal resistance of lithium-ion secondary batteries increases, and voltage drop does not occur at a high charge-discharge rate of lithium-ion secondary batteries.

According to the cathode material for a lithium-ion secondary battery of the present embodiment, since the particle size distribution of the secondary particles has the maximum value of the relative particle amount on the fine particle side and the maximum value of the relative particle amount on the coarse particle side, the particle diameter at which the relative particle amount (%) on the fine particle side in the particle size distribution is maximized is in a range A of 0.70 µm or more and 2.00 µm or less, the particle diameter at which the relative particle amount (%) on the coarse particle side in the particle size distribution is maximized is in a range B of 7.00 µm or more and 15.00 µm or less, and the difference between the relative particle amount (%) at the particle diameter at which the relative particle amount of the secondary particles having a particle diameter in the range A is maximized and the relative particle amount (%) at a particle diameter at which the relative particle amount of the secondary particles having a particle diameter in the range B is maximized is 2.00% or more and 6.00% or less, it is possible to provide a cathode material for a lithium-ion secondary battery which is capable of sufficiently decreasing the contact resistance between a cathode active material and an electrode current collector, capable of increasing the porosity of an electrode by decreasing the density of a cathode mixture layer even in the case of strongly pressurizing the cathode mixture layer, and capable of suppressing the deterioration of the durability of the electrode caused by a change in the electrode structure arising from the expansion and shrinkage of the cathode active material during a charge and discharge cycle.

Method for Manufacturing Cathode Material for Lithium-Ion Secondary Battery

The cathode material for a lithium-ion secondary battery of the present embodiment can be manufactured by granulating cathode active material particles obtained using a manufacturing method described below.

Method for Manufacturing Cathode Active Material Particles

A method for manufacturing the cathode active material particles in the present embodiment includes, for example, a manufacturing step of the central particles and a precursor of the central particles, a slurry preparation step of preparing a slurry by mixing at least one central particle raw material selected from the group consisting of the central particles and the precursor of the central particles, an organic compound which is a carbonaceous film precursor, and water, and a calcination step of drying the slurry and calcinating the obtained dried substance in a non-oxidative atmosphere.

Step of Manufacturing Central Particles and Precursor of Central Particles

As a method for manufacturing the compound (the central particles) represented by General Formula $Li_xFe_yM_zPO_4$ (here, M represents at least one element selected from the group consisting of Mg, Ca, Co, Sr, Ba, Ti, Zn, B, Al, Ga, In, Si, Ge, and rare earth elements, $0.95 \leq x \leq 1.10$, $0.80 \leq y \leq 1.10$, and $0.00 \leq z \leq 0.20$), a method of the related art such as a solid phase method, a liquid phase method, or a gas phase method is used. Examples of $Li_xFe_yM_zPO_4$ obtained using the above-described method include particulate substances (hereinafter, in some cases, referred to as "$Li_xFe_yM_zPO_4$ particles").

The $Li_xFe_yM_zPO_4$ particles are obtained by, for example, hydrothermally synthesizing a slurry-form mixture obtained by mixing a Li source, a Fe source, a P source, water, and, if necessary, an M source. By means of the hydrothermal synthesis, $Li_xFe_yM_zPO_4$ is generated as a precipitate in water. The obtained precipitate may be a precursor of $Li_xFe_yM_zPO_4$. In this case, target $Li_xFe_yM_zPO_4$ particles are obtained by calcinating the precursor of $Li_xFe_yM_zPO_4$.

In this hydrothermal synthesis, a pressure-resistant airtight container is preferably used.

Here, examples of the Li source include lithium salts such as lithium acetate ($LiCH_3COO$) and lithium chloride (LiCl), lithium hydroxide (LiOH), and the like. Among these, as the Li source, at least one selected from the group consisting of lithium acetate, lithium chloride, and lithium hydroxide is preferably used.

Examples of the Fe source include divalent iron salts such as iron (II) chloride ($FeCl_2$), iron (II) acetate ($Fe(CH_3COO)_2$), and iron (II) sulfate ($FeSO_4$). Among these, as the Fe source, at least one selected from the group consisting of iron (II) chloride, iron (II) acetate, andiron (II) sulfate is preferably used.

Examples of the P source include phosphoric acid compounds such as phosphoric acid ($H_3PO_4$), ammonium dihydrogen phosphate ($NH_4H_2PO_4$), diammonium hydrogen phosphate ($(NH_4)_2HPO_4$), and the like. Among these, as the P source, at least one selected from the group consisting of phosphonic acid, ammonium dihydrogen phosphate, and diammonium hydrogen phosphate is preferably used.

Examples of the M source include chlorides, carboxylates, sulfates, and the like including at least one element selected from the group consisting of Mg, Ca, Co, Sr, Ba, Ti, Zn, B, Al, Ga, In, Si, Ge, and rare earth elements.

Slurry Preparation Step

By means of the slurry preparation step, the organic compound which is the precursor of the carbonaceous film is interposed among the central particles, and the organic compound and the central particles are uniformly mixed together, and thus the surfaces of the central particles can be uniformly coated with the organic compound.

Furthermore, by means of the calcination step, the organic compound that coats the surfaces of the central particles is carbonized, thereby obtaining cathode active material particles including the central particles that are uniformly coated with the carbonaceous film.

The organic compound that is used in the method for manufacturing the cathode active material particles in the present embodiment is not particularly limited as long as the compound is capable of forming the carbonaceous film on the surfaces of the central particles. Examples of the above-described organic compound include divalent alcohols such as polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinylacetate, glucose, fructose, galactose, mannose, maltose, sucrose, lactose, glycogen, pectin, alginic acid, glucomannan, chitin, hyaluronic acid, chondroitin, agarose, polyethers, and ethylene glycol, trivalent alcohols such as glycerin, and the like.

In the slurry preparation step, the central particle raw material and the organic compound are dissolved or dispersed in water, thereby preparing a homogeneous slurry.

In the dissolution or dispersion of these raw materials in water, it is also possible to add a dispersant thereto.

A method for dissolving or dispersing the central particle raw material and the organic compound in water is not particularly limited as long as the central particle raw material is dispersed in water and the organic compound is dissolved or dispersed in water. The above-described method is preferably a method in which a medium stirring-type dispersion device that stirs medium particles at a high rate such as a planetary ball mill, an oscillation ball mill, a bead mill, a paint shaker, or an attritor is used.

When the central particle raw material and the organic compound are dissolved or dispersed in water, it is preferable to disperse the central particle raw material in water in a primary particle form, then, add the organic compound to water, and stir the organic compound so as to be dissolved or dispersed. In such a case, the surfaces of the primary particles of the central particle raw material are easily coated with the organic compound. Therefore, the organic compound is uniformly dispersed on the surfaces of the primary particles of the central particle raw material, and consequently, the surfaces of the primary particles of the central particles are coated with the carbonaceous film derived from the organic compound.

Calcination Step

Next, the slurry prepared in the slurry preparation step is sprayed and dried in a high-temperature atmosphere, for example, in the atmosphere of 70° C. or higher and 250° C. or lower.

Next, the obtained dried substance is calcinated in a non-oxidative atmosphere at a temperature of preferably 600° C. or higher and 1,000° C. or lower and more preferably 680° C. or higher and 780° C. or lower for 0.1 hours or longer and 40 hours or shorter.

The non-oxidative atmosphere is preferably an atmosphere filled with an inert gas such as nitrogen ($N_2$), argon (Ar), or the like. In a case in which it is necessary to further suppress the oxidation of the dried substance, a reducing atmosphere including approximately several percentages by volume of a reducing gas such as hydrogen ($H_2$) is preferred. In addition, for the purpose of removing organic components evaporated in the non-oxidative atmosphere during the calcination, a susceptible or burnable gas such as oxygen ($O_2$) may be introduced into the non-oxidative atmosphere.

Here, when the calcination temperature is set to 600° C. or higher, it is easy for the organic compound in the dried substance to be sufficiently decomposed and reacted, and the organic compound is easily and sufficiently carbonized. As a result, it is easy to prevent the generation of a high-resistance decomposed substance of the organic compound in the obtained agglomerates. In addition, when the calcination temperature is set to 680° C. or higher, during the calendering of an electrode for which a calcinated substance is used as the cathode active material particles, the porosity of the electrode does not excessively increase, and thus the electron migration resistance in the cathode mixture layer decreases, and the energy density improves. Meanwhile, when the calcination temperature is set to 1,000° C. or lower, lithium (Li) in the central particle raw material is not easily evaporated, and the particle growth of the central particles to a size that is equal to or larger than the target size is suppressed. As a result, in a case in which lithium-ion secondary batteries including a cathode including the cathode material for a lithium-ion secondary battery of the present embodiment are produced, it is possible to prevent the discharge capacity at a high charge-discharge rate from being decreased, and it is possible to realize lithium-ion secondary batteries having sufficient charge and discharge rate performance. In addition, when the calcination temperature is set to 780° C. or lower, during the pressurization of an electrode for which the calcinated substance is used as the cathode active material, the porosity of the electrode does not excessively increase, and thus it becomes possible to suppress the deterioration of the durability caused by the change in the electrode structure arising from the expansion and shrinkage of the cathode active material during a charge and discharge cycle.

Heat that is applied to the dried substance is preferably as uniform as possible. When heat is uniformly applied to the dried substance, the powder properties which easily change at the calcination temperature become uniform in the dried substance, the bias of the current distribution in the electrode is suppressed, and the reaction uniformity improves.

Examples of a container for a thermal treatment which is capable of uniformly imparting heat to the dried substance include a container as illustrated in FIG. 1.

A container for a thermal treatment 10 includes a container main body 11 and heat-transfer bodies 12 which are provided so as to protrude from an inner bottom surface 11a of the container main body 11 and are made of a solid body having a cylindrical shape.

The heat-transfer body 12 is provided to be perpendicular to the inner bottom surface 11a of the container main body 11 and is disposed in the thickness direction (the depth direction of the inside of the container main body 11) of the container main body 11.

The disposition of the heat-transfer bodies 12 is not particularly limited, but the heat-transfer bodies 12 are disposed so that heat is uniformly imparted to the dried substance (granulated body) 30 stored in the container main body 11 through the heat-transfer bodies 12.

The heat-transfer body 12 is made of a material having a higher thermal conductivity than the dried substance 30. In addition, the container main body 11 and the heat-transfer bodies 12 are preferably made of the same material. From the viewpoint of the easy processing, the inexpensive price, and the high thermal conductivity, for the container main body 11 and the heat-transfer bodies 12, a carbon-based material is preferably used.

In addition, in the container main body 11, in a case in which the sum of the apparent areas of the container main body 11 and the heat-transfer bodies 12 which are in contact with the dried substance 30 is represented by A, and the apparent volume of the dried substance 30 is represented by V, the ratio (V/A) of the volume V to the sum A is preferably 2.5 or less.

When the ratio (V/A) of the volume V to the sum A is more than 2.5, it becomes impossible to uniformly impart heat to all of the dried substance 30 stored in the container main body 11 through the heat-transfer bodies 12.

By means of the above-described steps, the cathode material for a lithium-ion secondary battery made of agglomerates (granulated bodies) of the cathode active material particles in which the surfaces of the primary particles of the central particles are coated with carbon (carbonaceous film) generated by the thermal decomposition of the organic compound in the dried substance are obtained.

Cathode for Lithium-Ion Secondary Battery

A cathode for a lithium-ion secondary battery of the present embodiment includes cathode active material particles having central particles represented by General Formula $Li_xFe_yM_zPO_4$ (here, M represents at least one element selected from the group consisting of Mg, Ca, Co, Sr, Ba, Ti, Zn, B, Al, Ga, In, Si, Ge, and rare earth elements, $0.95 \leq x \leq 1.10$, $0.80 \leq y \leq 1.10$, and $0.00 \leq z \leq 0.20$) and a carbonaceous film that coats the surfaces of the central particles.

The cathode for a lithium-ion secondary battery of the present embodiment includes an electrode current collector made of a metal foil and a cathode mixture layer formed on the electrode current collector, and the cathode mixture layer preferably includes the cathode material for a lithium-ion secondary battery of the present embodiment. The cathode for a lithium-ion secondary battery of the present embodiment is preferably a cathode obtained by forming the cathode mixture layer on one main surface of the electrode current collector using the cathode material for a lithium-ion secondary battery of the present embodiment.

Electrode Porosity

The porosity of the electrode in the cathode for a lithium-ion secondary battery of the present embodiment is preferably 33.0% or more and 37.0% or less.

When the porosity of the electrode is 33.0% or more, it is possible to suppress the deterioration of the durability caused by the change in the electrode structure arising from the expansion and shrinkage of a cathode active material during a charge and discharge cycle. Meanwhile, when the porosity of the electrode is 37.0% or less, the number of the contact points between cathode active material particles in the cathode mixture layer or between the cathode active material particles and the conductive auxiliary agent does not excessively decrease, and thus the electron migration resistance in the cathode mixture layer decreases, and it is possible to prevent the deterioration of the durability.

Since the cathode for a lithium-ion secondary battery of the present embodiment includes the cathode material for a lithium-ion secondary battery of the present embodiment, lithium-ion secondary batteries for which the cathode for a lithium-ion secondary battery of the present embodiment is used have a high energy density and have excellent durability.

Method for Manufacturing Cathode for Lithium-Ion Secondary Battery

A method for manufacturing the cathode for a lithium-ion secondary battery of the present embodiment is not particularly limited as long as the cathode mixture layer can be formed on one main surface of the electrode current collector using the cathode material for a lithium-ion secondary battery of the present embodiment. Examples of the method for manufacturing the cathode for a lithium-ion secondary battery of the present embodiment include the following method.

First, the cathode material for a lithium-ion secondary battery of the present embodiment, a binder made of a binder resin, and a solvent are mixed together, thereby preparing cathode material paste. At this time, to the cathode material paste in the present embodiment, a conductive auxiliary agent such as carbon black may be added if necessary.

Binder

As the binder, that is, the binder resin, for example, a polytetrafluoroethylene (PTFE) resin, a polyvinylidene fluoride (PVdF) resin, fluorine rubber, or the like is preferably used.

The blending amount of the binder used to prepare the cathode material paste is not particularly limited, but is, for example, preferably 1 part by mass or more and 30 parts by mass or less and more preferably 3 parts by mass or more and 20 parts by mass or less with respect to 100 parts by mass of the cathode material for a lithium-ion secondary battery.

When the blending amount of the binder is 1 part by mass or more, it is possible to sufficiently improve the binding property between the cathode mixture layer and the electrode current collector. Therefore, it is possible to prevent the cathode mixture layer from being cracked or dropped during the formation of the cathode mixture layer by means of rolling or the like. In addition, it is possible to prevent the cathode mixture layer from being peeled off from the electrode current collector in processes of charging and discharging lithium-ion secondary batteries and prevent the battery capacity or the charge-discharge rate from being decreased. Meanwhile, when the blending amount of the binder is 30 parts by mass or less, it is possible to prevent the internal resistance of the cathode material for a lithium-ion secondary battery from being decreased and prevent the battery capacity at a high charge-discharge rate from being decreased.

Conductive Auxiliary Agent

The conductive auxiliary agent is not particularly limited, and, for example, at least one element selected from the group consisting of particulate carbon such as acetylene black (AB), KETJEN BLACK, and furnace black and fibrous carbon such as vapor-grown carbon fiber (VGCF) and carbon nanotube is used.

Solvent

The solvent that is used in the cathode material paste including the cathode material for a lithium-ion secondary battery of the present embodiment is appropriately selected depending on the properties of the binder. When the solvent is appropriately selected, it is possible to facilitate the application of the cathode material paste to substances to be coated such as the electrode current collector.

Examples of the solvent include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methyl-2-pyrrolidinone (NMP), glycols such as ethylene glycol, diethylene glycol, and propylene glycol, and the like. These solvents may be used singly or in a mixture form of two or more solvents.

The content rate of the solvent in the cathode material paste is preferably 50% by mass or more and 70% by mass or less and more preferably 55% by mass or more and 65% by mass or less in a case in which the total mass of the cathode material for a lithium-ion secondary battery of the present embodiment, the binder, and the solvent is set to 100% by mass.

When the content rate of the solvent in the cathode material paste is in the above-described range, it is possible to obtain cathode material paste having excellent cathode formability and excellent battery characteristics.

A method for mixing the cathode material for a lithium-ion secondary battery of the present embodiment, the binder, the conductive auxiliary agent, and the solvent is not particularly limited as long as these components can be uniformly mixed together. Examples thereof include mixing methods in which a kneader such as a ball mill, a sand mill, a planetary (sun-and-planet) mixer, a paint shaker, or a homogenizer is used.

The cathode material paste is applied to one main surface of the electrode current collector so as to form a coated film, and then this coated film is dried, thereby obtaining an electrode current collector having a coated film made of the mixture of the cathode material and the binder formed on one main surface.

After that, the coated film is pressed by pressure and is dried, thereby obtaining a cathode having the cathode mixture layer on one main surface of the electrode current collector.

Lithium-Ion Secondary Battery

A lithium-ion secondary battery of the present embodiment includes a cathode, an anode, and a non-aqueous electrolyte, in which the cathode is the cathode for a lithium-ion secondary battery of the present embodiment. Specifically, the lithium-ion secondary battery of the present embodiment includes the cathode for a lithium-ion secondary battery of the present embodiment as a cathode, an anode, a separator, and a non-aqueous electrolyte.

In the lithium-ion secondary battery of the present embodiment, the anode, the non-aqueous electrolyte, and the separator are not particularly limited.

Anode

Examples of the anode include anodes including an anode material such as Li metal, carbon materials such as natural graphite and hard carbon, Li alloys, $Li_4Ti_5O_{12}$, $Si(Li_{4.4}Si)$, and the like.

Non-Aqueous Electrolyte

Examples of the non-aqueous electrolyte include non-aqueous electrolytes obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 $mol/dm^3$.

Separator

As the separator, it is possible to use, for example, porous propylene.

In addition, instead of the non-aqueous electrolyte and the separator, a solid electrolyte may be used.

Since the lithium-ion secondary battery of the present embodiment includes the cathode for a lithium-ion secondary battery of the present embodiment as the cathode, the lithium-ion secondary battery has a high energy density and has excellent durability.

EXAMPLES

Hereinafter, the present invention will be more specifically described using examples and comparative examples, but the present invention is not limited to the following examples.

Example 1

Synthesis of Cathode Material for Lithium-Ion Secondary Battery

Lithium phosphate ($Li_3PO_4$) (1,000 mol) andiron (II) sulfate ($FeSO_4$) (1,000 mol) were added to and mixed with water so that the total amount reached 1,000 L, thereby preparing a homogeneous slurry-form mixture.

Next, this mixture was stored in a pressure-resistant airtight container having a capacity of 2,000 L and was hydrothermally synthesized at 200° C. for 12 hours, thereby generating a precipitate.

Next, this precipitate was cleaned with water, thereby obtaining a cake-form precursor of a cathode active material.

Next, a polyethylene glycol (0.6 kg) as an organic compound and water were added to this precursor of the cathode active material (10 kg in terms of solid content), and a dispersion treatment was carried out on a mixture thereof using zirconia balls having a diameter of 5 mm as medium particles in a bead mill for one hour, thereby preparing a homogeneous slurry. At this time, the amount of the pure water was adjusted so that the proportion of the mass of the precursor of the cathode active material (the numerator) in the mass of the slurry (the denominator) reached 0.4.

Next, this slurry was sprayed and dried in the atmosphere at 200° C., thereby obtaining a granulated body of a precursor of a cathode material which was coated with an organic substance.

Next, the obtained granulated body (5 kg) was stored in a thermal treatment container illustrated in FIG. 1, was heated up to 680° C. (calcination temperature) at a temperature-rise rate of 300° C./hour in a nitrogen atmosphere, and then was held for two hours. After that, the granulated body was naturally cooled, thereby obtaining a cathode material 1 coated with a carbonaceous film.

Production of Lithium-Ion Secondary Battery

The cathode material 1, polyvinylidene fluoride (PVdF) as a binder, and acetylene black (AB) as a conductive auxiliary agent were mixed into N-methyl-2-pyrrolidinone (NMP) which was a solvent so that the mass ratio (the cathode material 1:AB:PVdF) in paste reached 94:1:5, and the components were kneaded using a kneader (trade name: THINKY MIXER, manufactured by Thinky Corporation) for 10 minutes under a conditions of a revolution rate of 2,000 rpm, thereby preparing cathode material paste (for the cathode).

This cathode material paste (for the cathode) was applied onto the surface of a 30 µm-thick aluminum foil (electrode current collector) so as to form a coated film, and the coated film was dried, thereby forming a cathode mixture layer on the surface of the aluminum foil. The surface of the aluminum foil was not roughened by means of, particularly, a chemical treatment or the like, and an aluminum foil having a planar surface was used. The amount of the cathode material paste was adjusted so that the capacity density of a cathode mixture layer to be obtained reached 1.8 mAh/cm$^2$ in the case of computation with the capacity of lithium iron phosphate set to 170 mAh/g.

After that, the cathode mixture layer was pressurized using a roll calendering machine having a load management function at a gap of 60 µm, a linear pressure of 8 t/250 mm, and a feeding rate of 0.5 m/min, thereby producing a cathode 1 of Example 1.

A lithium metal was disposed as an anode with respect to this cathode 1, and a separator made of porous polypropylene was disposed between the cathode 1 and the anode, thereby producing a member for a battery 1.

Meanwhile, ethylene carbonate and diethyl carbonate were mixed together in a mass ratio of 1:1, and furthermore, 11 mol/L of a LiPF$_6$ solution was added thereto, thereby preparing an electrolyte solution 1 having lithium ion conductivity.

Next, the member for a battery 1 was immersed in the electrolyte solution 1, thereby producing a lithium-ion secondary battery 1 of Example 1.

Example 2

A cathode material 2 of Example 2 was obtained in the same manner as in Example 1 except for the fact that the calcination temperature was set to 700° C.

A lithium-ion secondary battery 2 of Example 2 was produced in the same manner as in Example 1 except for the fact that the cathode material 2 was used.

Example 3

A cathode material 3 of Example 3 was obtained in the same manner as in Example 1 except for the fact that the calcination temperature was set to 720° C.

A lithium-ion secondary battery 3 of Example 3 was produced in the same manner as in Example 1 except for the fact that the cathode material 3 was used.

Example 4

A cathode material 4 of Example 4 was obtained in the same manner as in Example 1 except for the fact that the calcination temperature was set to 740° C.

A lithium-ion secondary battery 4 of Example 4 was produced in the same manner as in Example 1 except for the fact that the cathode material 4 was used.

Example 5

A cathode material 5 of Example 5 was obtained in the same manner as in Example 1 except for the fact that the calcination temperature was set to 760° C.

A lithium-ion secondary battery 5 of Example 5 was produced in the same manner as in Example 1 except for the fact that the cathode material 5 was used.

Example 6

A cathode material 6 of Example 6 was obtained in the same manner as in Example 1 except for the fact that the calcination temperature was set to 780° C.

A lithium-ion secondary battery 6 of Example 6 was produced in the same manner as in Example 1 except for the fact that the cathode material 6 was used.

Comparative Example 1

A cathode material 10 of Comparative Example 1 was obtained in the same manner as in Example 1 except for the fact the calcination temperature was set to 640° C.

A lithium-ion secondary battery 10 of Comparative Example 1 was produced in the same manner as in Example 1 except for the fact that the cathode material 10 was used.

Comparative Example 2

A cathode material 11 of Comparative Example 2 was obtained in the same manner as in Example 1 except for the fact that the calcination temperature was set to 660° C.

A lithium-ion secondary battery 11 of Comparative Example 2 was produced in the same manner as in Example 1 except for the fact that the cathode material 11 was used.

Comparative Example 3

A cathode material 12 of Comparative Example 3 was obtained in the same manner as in Example 1 except for the fact that the calcination temperature was set to 790° C.

A lithium-ion secondary battery 12 of Comparative Example 3 was produced in the same manner as in Example 1 except for the fact that the cathode material 12 was used.

Comparative Example 4

A cathode material 13 of Comparative Example 4 was obtained in the same manner as in Example 1 except for the fact that the calcination temperature was set to 800° C.

A lithium-ion secondary battery 13 of Comparative Example 4 was produced in the same manner as in Example 1 except for the fact that the cathode material 13 was used.

Evaluation of Cathode Material for Lithium-Ion Secondary Battery and Lithium-Ion Secondary Battery The cathode materials for a lithium-ion secondary battery and the lithium-ion secondary batteries of Example 1 to Example 6 and Comparative Example 1 to Comparative Example 4 were evaluated as described below.

1. Particle Size Distribution

The particle size distribution of the cathode material for a lithium-ion secondary battery was measured using the following method.

The median diameter was measured using a measurement device (trade name: LA-950V2, manufactured by Horiba Ltd.).

First, pure water (40 g) and polyvinyl pyrrolidone (PVP) (0.12 g) as a dispersion liquids and the cathode material for a lithium-ion secondary battery (0.04 g) as specimen powder were weighed in a 70 mL mayonnaise bottle. This mayonnaise bottle was manually shaken approximately ten times so as to mix the specimen powder and the dispersion liquids well.

Next, the mixed solution of the specimen powder and the dispersion liquids was treated with ultrasonic waves for two minutes under conditions of an output of 5 and a pulse of 50% in an ultrasonic homogenizer (trade name: SONIFIER450, manufactured by Branson Ultrasonics, Emersion Japan, Ltd.), and the particle size distribution was measured using the obtained dispersion solution.

The median diameter was measured with the data loading number set to 5,000 for a semiconductor laser (LD) and 1,000 for a light-emitting diode (LED), and the data computation conditions were as described below.

Figure 2:
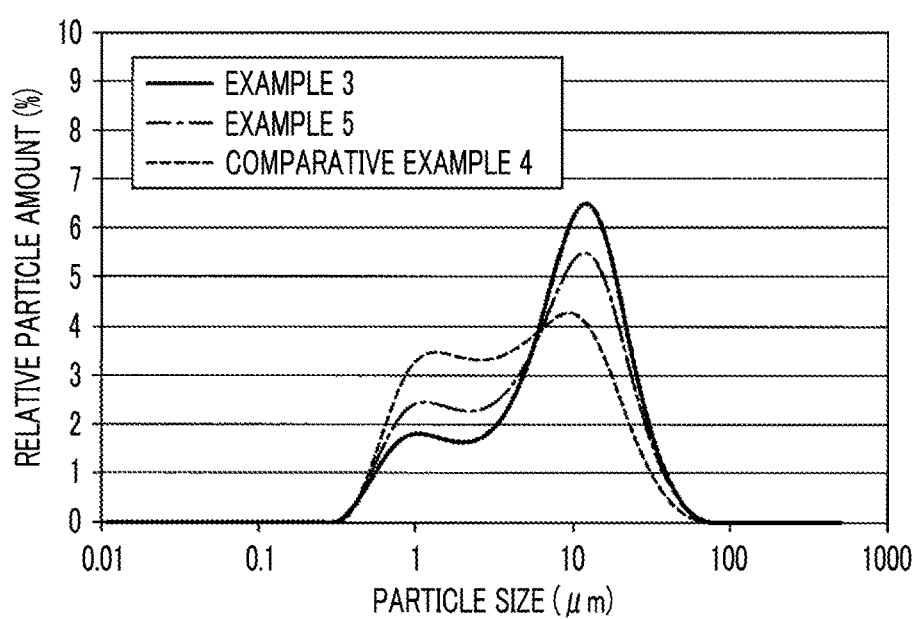
FIG. 2 is a graph illustrating particle size distributions of cathode materials for a lithium-ion secondary battery in Example 3, Example 5, and Comparative Example 4.

Computation Conditions
(Sample Refractive Index)
LD real part: 1.60
LD imaginary part: 0.24
LED real part: 1.60
LED imaginary part: 0.24
(Dispersion medium refractive index)
LD real part: 1.33
LD imaginary part: 0.00
LED real part: 1.33
LED imaginary part: 0.00
(Number of repetitions): 15 times
(Particle diameter criterion): Volume
(Computation algorithm): Ver. 4XX compatible
(Shift): 1
(Smoothing): 17
(Special computation): Red LED alone As a result of measuring the particle size distribution, the particle size distribution had a maximum value of the relative particle amount (%) on the fine particle side and a maximum value of the relative particle amount (%) on the coarse particle side as illustrated in FIG. 2. Here, the maximum value of the relative particle amount (%) at which the particle diameter was in a range of 0.70 μm or more and 2.00 μm or less was considered as the maximum value of the relative particle amount (%) on the fine particle side, and the maximum value of the relative particle amount (%) at which the particle diameter was in a range of 7.00 μm or more and 15.00 μm or less was considered as the maximum value of the relative particle amount (%) on the coarse particle side.

2. Porosity of Electrode

The porosity of the electrode (cathode mixture layer) in the cathode for a lithium-ion secondary battery was calculated by multiplying the ratio of the combined value of the volumes of the cathode material, the conductive auxiliary agent, and the binder (numerator) to the volume of the cathode mixture layer excluding the aluminum electrode current collector in the pressurized cathode (denominator) by 100. Meanwhile, the volume of the cathode mixture layer made up of the cathode material, the conductive auxiliary agent, and the binder was calculated as described below. The masses of the respective materials were calculated from the mass of the cathode material and the mass ratio between the cathode material, the conductive auxiliary agent, and the binder during the preparation of the cathode material paste, and the true density and mass of each of the materials were multiplied by each other, thereby calculating the volume of each of the materials.

3. Capacity Retention After 500 Cycles

Regarding the capacity retention of the lithium-ion secondary battery after 500 cycles, constant-current charging was carried out at a current value of 2.0 C until the battery voltage reached 3.7 V and then discharging was carried out at a current value of 2.0 C until the battery voltage reached 2.5 V in an environment of 45° C. in one cycle, this cycle was repeated 500 times, and the proportion of the discharge capacity at the 500th cycle as the numerator to the discharge capacity at the first cycle as the denominator was evaluated as the capacity retention. In a case in which the porosity of the electrode is too small, the capacity retention decreases.

In addition, in a case in which the capacity retention after 500 cycles was 90% or more, the electron conductivity was evaluated as O, and, in a case in which the capacity retention after 500 cycles was less than 90%, the electron conductivity was evaluated as X. Meanwhile, lithium-ion secondary batteries in which the capacity retention after 500 cycles was 90% or more are determined to be excellent in terms of durability.

Evaluation Results

The evaluation results of the cathode materials for a lithium-ion secondary battery and the lithium-ion secondary batteries of Example 1 to Example 6 and Comparative Example 1 to Comparative Example 4 are shown in Table 1. In addition, the particle size distributions of Example 3, Example 5, and Comparative Example 4 are illustrated in FIG. 2.

TABLE 1

| | Calcination temperature [° C.] | Particle diameter A at which relative particle amount on fine particle side in particle size distribution is maximized [μm] | Relative particle amount a at particle diameter at which relative particle amount of secondary particles having particle diameter A in particle size distribution is maximized [%] | Particle diameter B at which relative particle amount on coarse particle side in particle size distribution is maximized [μm] | Relative particle amount b at particle diameter at which relative particle amount of secondary particles having particle diameter B in particle size distribution is maximized [%] | Relative particle amount a − relative particle amount b [%] | Porosity of electrode [%] | Capacity retention after 500 cycles [%] | Electron conductivity evaluation |
|---|---|---|---|---|---|---|---|---|---|
| Example 1 | 680 | 0.88-1.01 | 1.22 | 10.10-11.57 | 7.21 | 5.99 | 36.9 | 92 | ○ |
| Example 2 | 700 | 0.88-1.01 | 1.53 | 10.10-11.57 | 6.72 | 5.19 | 36.5 | 94 | ○ |
| Example 3 | 720 | 0.88-1.01 | 1.81 | 10.10-11.57 | 6.48 | 4.67 | 36.0 | 95 | ○ |
| Example 4 | 740 | 1.01-1.15 | 2.17 | 10.10-11.57 | 5.86 | 3.69 | 35.2 | 92 | ○ |
| Example 5 | 760 | 1.01-1.15 | 2.45 | 10.10-11.57 | 5.48 | 3.03 | 34.1 | 91 | ○ |
| Example 6 | 780 | 1.15-1.32 | 2.92 | 8.82-10.1 | 5.01 | 2.09 | 33.7 | 90 | ○ |
| Comparative Example 1 | 640 | 0.77-0.88 | 0.97 | 10.10-11.57 | 7.62 | 6.65 | 38.3 | 88 | X |
| Comparative Example 2 | 660 | 0.77-0.88 | 1.06 | 10.10-11.57 | 7.45 | 6.39 | 37.6 | 89 | X |
| Comparative Example 3 | 790 | 1.32-1.51 | 3.25 | 7.70-8.82 | 4.63 | 1.38 | 33.4 | 86 | X |
| Comparative Example 4 | 800 | 1.15-1.32 | 3.47 | 7.70-8.82 | 4.26 | 0.79 | 32.7 | 84 | X |

When Examples 1 to 6 and Comparative Examples 1 to 4 are compared with each other from the results in Table 1, it was found that, in Comparative Example 1 and Comparative Example 2 in which the difference between the relative particle amount (%) at the particle diameter at which the relative particle amount of the secondary particles having a particle diameter in the range A of 0.70 μm or more and 2.00 μm or less, in which the relative particle amount on the fine particle side in the particle size distribution was maximized, was maximized and the relative particle amount (o) at the particle diameter at which the relative particle amount of the secondary particles having a particle diameter in the range B of 7.00 μm or more and 15.00 μm or less, in which the relative particle amount on the coarse particle side in the particle size distribution was maximized, was maximized exceeded 6.0%, the capacity retention after 500 cycles was less than 90%, and the durability was poor. This is considered to be because the cathode active material was not easily stuck during the pressurization of the cathode mixture layer, and thus the porosity of the electrode (cathode mixture layer) increased to 37% or more, and the electron migration resistance in the cathode mixture layer decreased.

In addition, it was found that, also in Comparative Example 3 and Comparative Example 4 in which the difference between the relative particle amount (%) at the particle diameter at which the relative particle amount of the secondary particles having a particle diameter in the range A of 0.70 μm or more and 2.00 μm or less, in which the relative particle amount on the fine particle side in the particle size distribution was maximized, was maximized and the relative particle amount (o) at the particle diameter at which the relative particle amount of the secondary particles having a particle diameter in the range B of 7.00 μm or more and 15.00 μm or less, in which the relative particle amount on the coarse particle side in the particle size distribution was maximized, was maximized was less than 2.0%, the capacity retention after 500 cycles was less than 90%, and the durability was poor. This is considered to be because the cathode active material was easily stuck during the pressurization of the cathode mixture layer, and thus the porosity of the electrode (cathode mixture layer) decreased to 33.4% or less, and the change in the electrode structure due to the expansion and shrinkage of the cathode active material during a charge and discharge cycle increased, and the number of lithium ion conduction paths in the electrode decreased or the conduction paths in the electrode frequently ruptured, and thus the durability deteriorated.

On the other hand, in Example 1 to Example 6 in which the difference between the relative particle amount (%) at the particle diameter at which the relative particle amount of the secondary particles having a particle diameter in the range A of 0.70 μm or more and 2.00 μm or less, in which the relative particle amount on the fine particle side in the particle size distribution was maximized, was maximized and the relative particle amount (o) at the particle diameter at which the relative particle amount of the secondary particles having a particle diameter in the range B of 7.00 μm or more and 15.00 μm or less, in which the relative particle amount on the coarse particle side in the particle size distribution was maximized, was maximized was 2.09% or more and 5.99% or less, and thus, even in a case in which the electrode (cathode mixture layer) was strongly pressurized and even when the porosity of the electrode increased, it was possible to provide lithium-ion secondary batteries being excellent in terms of the energy density, the input and output characteristics, and the durability.

Lithium-ion secondary batteries for which the cathode material for a lithium-ion secondary battery of the present invention is used have an excellent energy density and durability and are thus capable of significantly contributing to the advancement of the reliability of lithium-ion secondary batteries including mobile body uses.

What is claimed is:

1. A cathode material for a lithium-ion secondary battery, the cathode material comprising:
    secondary particles which are granulated cathode active material particles, wherein
    the cathode active material particles include central particles represented by general formula $Li_xFe_yM_zPO_4$, wherein M represents at least one element selected from the group consisting of Mg, Ca, Co, Sr, Ba, Ti, Zn, B, Al, Ga, In, Si, Ge, and rare earth elements, 0.95≤x≤1.10, 0.80≤y≤1.10, and 0.00≤z≤0.20, and a carbonaceous film that coats surfaces of the central particles,
    a particle size distribution of the secondary particles has at least two peaks, wherein the particle size distribution has a maximum value of a relative particle amount (%) on a fine particle side and a maximum value of a relative particle amount (%) on a coarse particle side,
    a particle diameter at which the relative particle amount (%) is maximized on the fine particle side in the particle size distribution is included in a range A which is 0.70 μm or more and 2.00 μm or less,
    a particle diameter at which the relative particle amount (%) is maximized on the coarse particle side in the particle size distribution is included in a range B which is 7.00 μm or more and 15.00 μm or less, and
    a difference between the maximum values of the relative particle amount (%) is 2.00% or more and 6.00% or less, wherein the maximum value on the fine particle side corresponds to a particle diameter of the secondary particles at which the relative particle amount is maximized while the particle diameter is in the range A, and the maximum value on the coarse particle side corresponds to a particle diameter of the secondary particles at which the relative particle amount of the secondary particles is maximized while the particle diameter is in the range B.

2. The cathode material for a lithium-ion secondary battery according to claim 1,
    wherein the difference between the maximum values of the relative particle amount (%) is 3.50% or more and 5.50% or less, wherein the maximum value on the fine particle side of the relative particle amount (%) corresponds to the particle diameter of the secondary particles which is in the range A, and the maximum value on the coarse particle side of the relative particle amount (%) corresponds to the particle diameter of the secondary particles which is in the range B.

3. The cathode material for a lithium-ion secondary battery according to claim 1,
    wherein the central particles comprises $LiFePO_4$.

4. A cathode for a lithium-ion secondary battery, comprising:
    an electrode current collector; and
    a cathode mixture layer formed on the electrode current collector,
    wherein the cathode mixture layer includes the cathode material for a lithium-ion secondary battery according to claim 1.

5. A lithium-ion secondary battery comprising:
    the cathode for a lithium-ion secondary battery according to claim 4.

6. The cathode material for a lithium-ion secondary battery according to claim 1, wherein the cathode material consists of the secondary particles, and the secondary particles consist of the granulated cathode active material particles.

7. The cathode material for a lithium-ion secondary battery according to claim 1,
    wherein the cathode active material particles consist of the central particles and the carbonaceous film.

8. The cathode material for a lithium-ion secondary battery according to claim 1,
    wherein the particle size distribution of the secondary particles has two peaks.

9. The cathode material for a lithium-ion secondary battery according to claim 1,
    wherein a difference between the maximum value of the relative particle amount (%) on the fine particle side and the maximum value of the relative particle amount (%) on the coarse particle side is 2.00% or more and 6.00% or less.

10. The cathode material for a lithium-ion secondary battery according to claim 1,
    wherein the central particles consist essentially of $LiFePO_4$.

11. The cathode material for a lithium-ion secondary battery according to claim 1,
    wherein the maximum value of the relative particle amount (%) on the fine particle side is 1.22% or more and 2.92% or less, and
    the maximum value of the relative particle amount (%) on the coarse particle side is 5.01% or more and 7.21% or less.

12. The cathode material for a lithium-ion secondary battery according to claim 1, wherein the granular secondary particles consist of the granulated cathode active material particles.

* * * * *